Nov. 21, 1961 G. THARRATT 3,009,672
JOINTURE FOR END-LOADING AIRCRAFT
Filed March 10, 1961 3 Sheets-Sheet 1

INVENTOR.
GEORGE THARRATT
BY
*Edwin Coates*
- ATTORNEY -

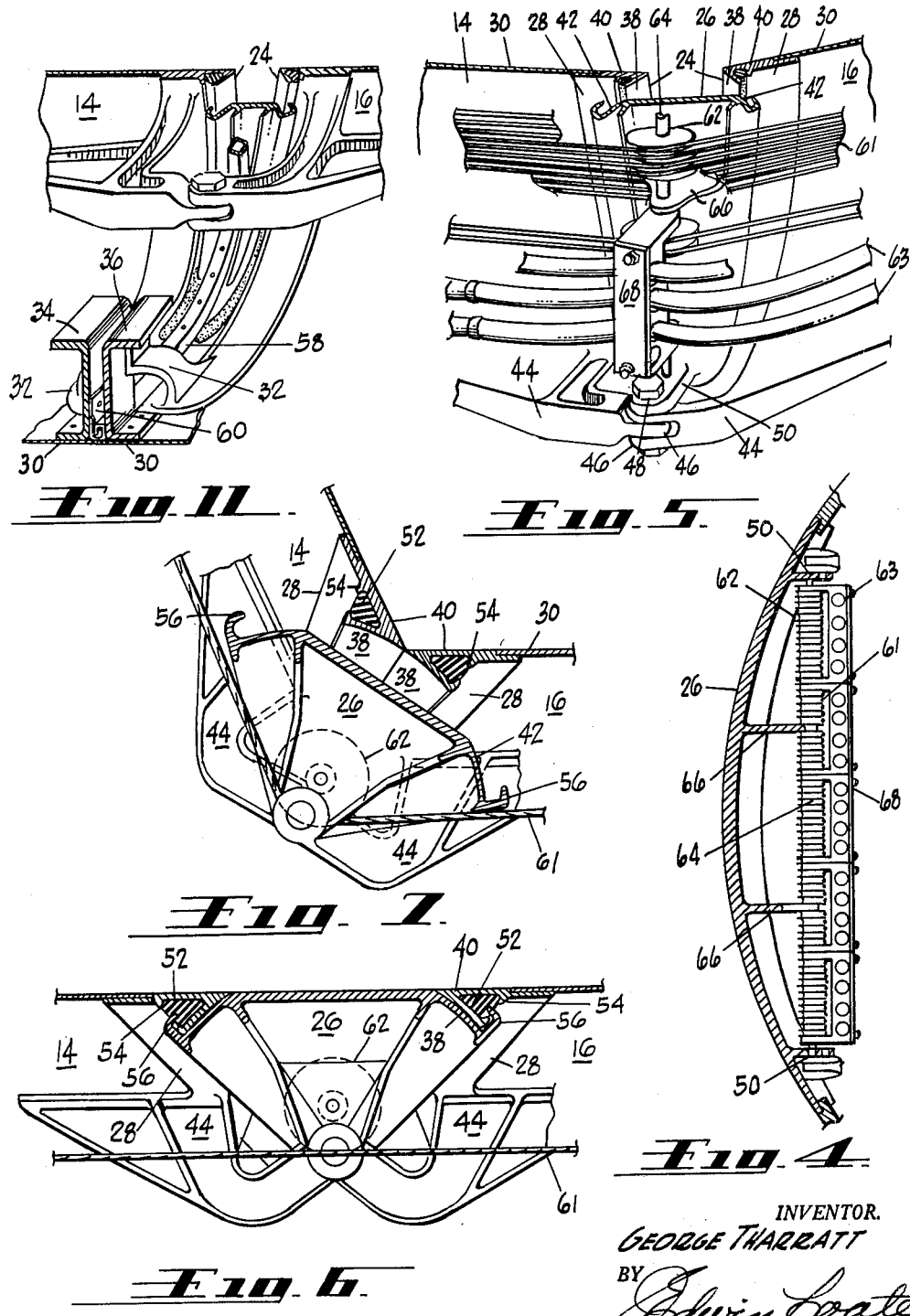

Nov. 21, 1961   G. THARRATT   3,009,672
JOINTURE FOR END-LOADING AIRCRAFT
Filed March 10, 1961   3 Sheets-Sheet 3

INVENTOR.
GEORGE THARRATT
BY Edwin Coates
- ATTORNEY -

United States Patent Office 3,009,672
Patented Nov. 21, 1961

3,009,672
JOINTURE FOR END-LOADING AIRCRAFT
George Tharratt, Encino, Calif., assignor to Douglas Aircraft Company, Inc., Santa Monica, Calif.
Filed Mar. 10, 1961, Ser. No. 94,840
6 Claims. (Cl. 244—137)

This invention relates to an end-loading cargo aircraft, and more particularly to a pressure sealed jointure for a movable end portion (either the nose or the tail portion) and the remaining body of the aircraft.

Prior art proposals for an end-loading aircraft have generally utilized a hinge arrangement for the end portion and the body wherein portions of the hinge protrude exteriorly beyond the fuselage wall. Such protuberances interfere with the aerodynamic smoothness of the aircraft exterior and therefore are not desirable. The present invention eliminates this drawback by providing for a hinge arrangement which is confined entirely within the aircraft interior. It also provides for a jointure between the end portion and the body which is completely sealed to maintain the internal pressurization commonly associated with modern aircraft. The jointure also utilizes an arrangement for keeping flight control cables and electrical wires intact and unbroken across the jointure when the end portion is opened. The latter arrangement permits simultaneous servicing of the aircraft control devices and electrical systems while the aircraft is being loaded, thereby reducing the ground turn-around time and contributing to the maximum utilization of the aircraft.

In more specific detail, the present invention provides for a jointure having a hinge arrangement with a vertical pivot axis which is located adjacent to one side of the aircraft in the vertical plane separating the end portion and the body. The hinge members comprise a pair of opposing triangular-shaped brackets rigidly attached to the fuselage wall in the end portion and the body, respectively, and connected together at a common hinge pivot point by interlocking lugs. Two pairs of these brackets, a lower and an upper pair, are preferred. To provide clearance for movement of the end portion away from the body, a portion of the fuselage wall adjacent the hinge pivot axis is removed from both the end portion and the body. The resulting opening has opposing concave sides which converge at the separation line at points slightly above and below the points defined by the intersection of the hinge pivot axis and the fuselage wall. For closing the opening and for maintaining continuity of the fuselage wall, a closure member having a surface conforming to the curved contour of the fuselage exterior is provided by the present invention. The closure member is supported in the opening by means of brackets pivotally connected to the hinge pivot points. This pivotal connection permits the closure member to be pushed out of the opening by the end portion when the latter is swung open.

For pressure sealing the jointure in accordance with the present invention, sealing means are provided between the frame members on the end portion and the body and also around the periphery of the opening in the fuselage wall. The latter means include resilient sealing elements mounted around the periphery of the opening and hooked projections or claws on the closure member which engage and depress the elements in sealing relationship when the jointure is closed.

In the jointure of the present invention, the vertical plane separating the end portion and the body is at a cant or angle in relation to the longitudinal axis of the aircraft rather than being substantially perpendicular to the axis. By virtue of this cant, the end portion need be moved through an angle less than 90° and still provide entry into the full loading diameter of the aircraft. It has been found that a cant angle of about 65° provides for the most favorable conditions insofar as balancing the relative sizes of the clearance opening, the hinge members, and the cargo floor is concerned. As the cant angle is increased towards 90°, larger clearance openings are required with consequent enlargement of the closure member and the hinge members. On the other hand, as the cant angle is decreased to one materially less than 65°, the cargo floor will have an increasingly large triangular portion at the jointure, which detracts from an efficient loading of the aircraft.

Also in the jointure of the present invention, the flight control cables and electrical wires extending from the end portion to the body are brought together at the side of the fuselage having the hinge arrangement. The control cables are then passed over a series of pulleys pivotally mounted on the closure member between the hinge pivot points. The diameters of these pulleys are such that the control cables mounted thereon pass through the hinge pivot axis. Since the pulleys move in conjunction with the closure member when the end portion is opened, no stretching of the cables takes place. Similarly, the electrical wires are passed over and attached to a support plate or a series of mounts, which are attached to the closure member adjacent the pulleys, whereby no appreciable stretching of the cables takes place.

These and other features of the invention will be better understood by reference to the accompanying drawings in which:

FIGURE 4 is a sectional elevational view taken along the line 4—4 in FIG. 3, showing the guide means for the flight control cables and electrical wires in accordance with the present invention;

FIGURE 5 is a perspective view of a portion of the hinge arrangement showing the lower hinge pivot point and a portion of the guide means of FIG. 4;

FIGURE 6 is a sectional plan view of a portion of the closure member and hinge arrangement taken along the line 6—6 of FIG. 3;

FIGURE 7 is the same view as FIG. 6, but shows the position of the closure member and the hinge members when the nose is fully opened;

Figure 3:
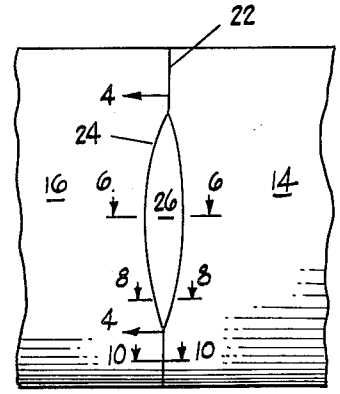
FIGURE 3 is an elevational view of a portion of the nose and body on the righthand side of the aircraft in FIG. 1, showing the exterior surface of the closure member in accordance with the present invention in its closed position.
Figure 10:
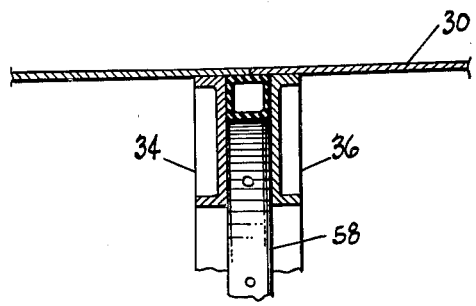

FIGURE 10 is a sectional plan view taken along the line 10—10 on FIG. 3, showing a portion of the sealing element and frame members which extend around the jointure; and FIGURE 11 is a perspective view of the lower end of the closure member and the lower hinge pivot point with the guide means removed for clarity. This figure also shows a portion of the sealing element and frame members which extend around the jointure.

Figure 1:
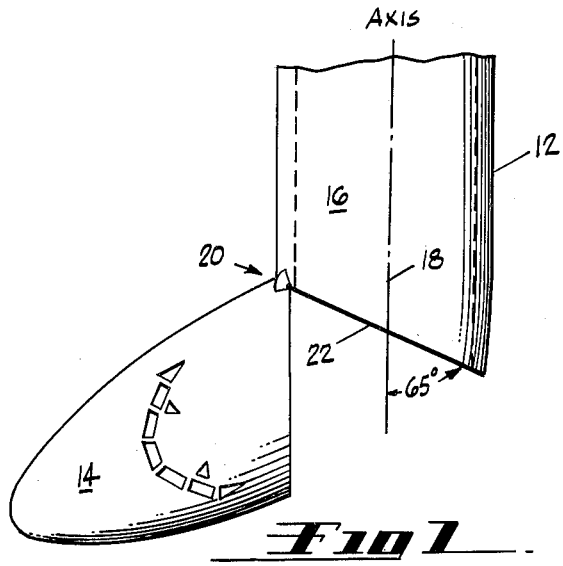
FIGURE 1 is a plan view of a portion of a swing-nose cargo aircraft in accordance with the present invention and shows the nose in fully opened position for loading.

In more specific detail, FIG. 1 shows a portion of a swing nose cargo aircraft having a generally cylindrical fuselage 12 with a nose 14 which is separable from the remainder of the aircraft body 16 at an imaginary vertical plane placed at an angle to the longitudinal axis 18 of the aircraft. As previously mentioned, the most favorable hinge design and loading conditions are obtained when the angle is approximately 65°. The nose can then be moved through an angle of only 65° and yet provide entry into the full loading diameter of the aircraft. The nose is swung open by conventional drive means (not shown) about an internal hinge arrangement, shown schematically at 20, which is located at the separation line 22 defined by the intersection of the vertical plane and the fuselage wall at the side of the aircraft which is furthest removed from the nose tip. A shorter distance from a loading dock to the cargo floor is provided by this location of the hinge arrangement than one which is on the opposite side of the aircraft. The general construction of the hinge arrangement and its location with respect to the aircraft are more clearly shown in FIG. 2.

FIG. 3 shows the clearance opening 24 cut in the fuselage wall of the nose 14 and body 16 to permit the nose 14 to move about its hinge. It will be noted that the opening 24 has symmetrically concave sides that converge at the separation line 22. To close the opening 24 and to maintain continuity of the fuselage wall when the nose 14 is closed, a closure member 26 is provided which has an exterior arcuate surface conforming to the contour of the fuselage wall (FIG. 4) and which has sides which abut against the clearance opening 24.

As shown more clearly in FIG. 5, the sides of the clearance opening 24 are actually formed by fuselage wall members 28 which are suitably attached to the fuselage skin 30. Members 28 are longitudinally coextensive with closure member 26, and at the upper and lower extremities are connected by brackets 32 to channeled frame members 34, 36 in the nose and body, respectively (FIG. 11). The frame members extend around the jointure, starting at the end of the fuselage wall members, and provide strength and rigidity to the nose and body portions at the jointure. Fuselage wall members 28 have an inwardly directed surface 38 which forms an angle in relation to exterior surface 40 forming part of the fuselage wall. Surface 38 acts as a bearing surface for closure member 26 which has a corresponding outwardly directed surface 42.

Figure 2:
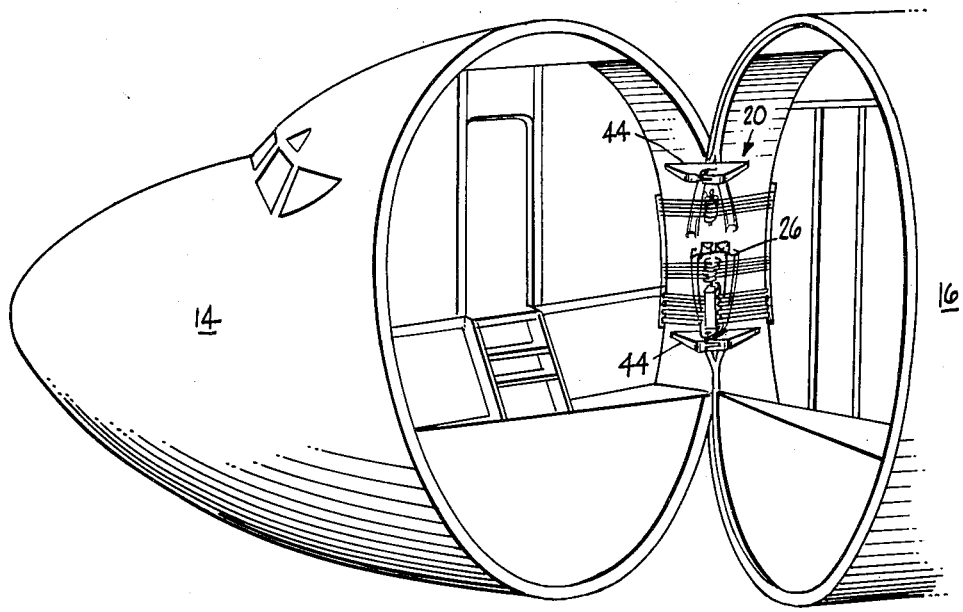
FIGURE 2 is a perspective view of the jointure between the nose and the body portion of the aircraft in FIG. 1, showing the interior hinge arrangement in accordance with the present invention.

Integral with the fuselage wall members 28 are a pair of triangular-shaped hinge brackets 44 pivotally connected together by a clevis joint formed by interlocking lugs 46 and a bolt 48. An upper and lower pair of these brackets are provided near the extremities of the closure member 26, as shown in FIG. 2. The bolts 48 define a vertical pivot axis for the hinge arrangement, which lies within the vertical plane separating the nose 14 and the body 16. Closure member 26 is attached to the upper and lower hinge pivot bolts 48 by ears 50 for pivotal movement in a manner to be hereinafter described.

Figure 8:
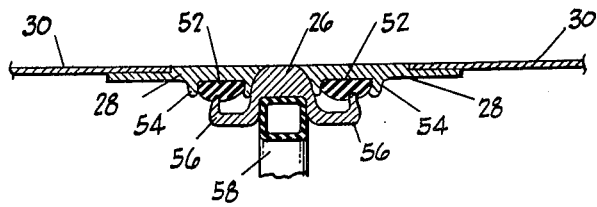
FIGURE 8 is a sectional plan view of a portion of the closure member taken along the line 8—8 of FIG. 3.
Figure 9:
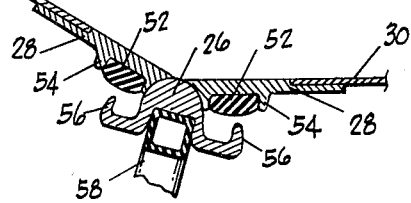
FIGURE 9 is the same plan view as FIG. 8, but shows the position of the closure member when the nose is fully opened.

For pressure sealing the jointure, resilient sealing elements 52 (FIGS. 6 and 7) are provided in the angle between surfaces 38 and 40 on the fuselage wall members 28. A ridge 54 helps to secure the sealing elements in place on the fuselage wall members. The closure member 26 has an outwardly directed hooked end or claw 56 adjoining surface 42 on both sides of the member. These claws are adapted to impinge on sealing elements 52 in the manner shown most clearly in FIGS. 6 and 8 to provide a seal around the clearance opening 24. As shown in FIG. 11, the remainder of the jointure is sealed by a resilient, hollow sealing element 58 attached to frame member 34 by plate 60 and extending a short ways beyond the tips of closure member 26 to provide a seal at the junction of the closure member and the fuselage wall members. Sealing element 58 is intermittently perforated on its innermost face so that the pressurization air can enter the element and inflate it, thereby providing a tighter seal at the jointure.

FIGS. 6 to 9 show the relative positions of the closure member 26, the fuselage wall members 28, and the hinge brackets 44 when the nose is closed and when the nose is opened for loading. As the nose portion 14 is swung open from the closed position shown in FIG. 6, hinge bracket 44 attached thereto comes into contact with the forward portion of the closure member 26 and causes the latter to move about the hinge pivot axis away from the clearance opening, as shown in FIG. 7. When the nose portion is closed, sealing element 52 in the nose portion engages the forward claw 56 on the closure member 26 and causes the member to move back to its original closed position shown in FIG. 6. In this position, it will be seen that a tight seal will be obtained about the clearance opening by virtue of the sealing means previously described.

During the opening and closing of the nose, the flight control cables 61 and electrical wires or cables 63 are guided over the hinge arrangement in the manner shown in FIGS. 4 and 5. The guide means for the control cables consist of a series of pulleys 62 mounted on a vertical rod 64 disposed between the ears 50 and suitably supported by brackets 66 attached to closure member 26. The diameters of the pulleys are such that the control cables mounted thereon will pass through the hinge pivot axis (FIGS. 6 and 7). Stretching of the control cables is prevented during opening of the nose by virtue of the fact that the pulleys move aftwardly together with the closure member 26. The electrical cables are shown to be guided over the hinge arrangement by a series of support mounts 68 adjacent the pulleys and pivotally attached to the rod 64. A single support plate may be substituted for these support mounts, if desired. Although a greater amount of stretching can be tolerated in the case of electrical cables than in the case of control cables, it will be noted that the mounting means shown and described herein minimize such stretching because of the close proximity of the electrical cables to the hinge pivot axis and also because of the small angle through which the nose portion rotates.

Although the presently preferred embodiment of the invention has been shown and described, it is to be understood that the invention is susceptible to variation in form and construction within the scope of the appended claims.

I claim:

1. A swing-nose jointure for a cargo aircraft comprising: a cylindrical fuselage; a nose portion and a body portion separable at a vertical plane which is at an angle of about 65° to the longitudinal axis of the aircraft; internal hinge members connecting the nose portion and the body portion, said hinge members having a vertical pivot axis located substantially within the separation plane at the aftmost side of the plane; fuselage wall members in the nose portion and the body portion defining a clearance opening in the fuselage wall adjacent the hinge pivot axis, said opening having concave sides converging at points slightly above and below the points defined by the intersection of the hinge pivot axis and the fuselage wall; a closure member adapted to fit said opening in a manner which maintains the continuity of the fuselage wall across the opening when the nose portion is closed and adapted to pivot about the hinge pivot axis for movement away from the opening when the nose portion is opened; guide means associated with the closure member for routing control cables and electrical wires from the nose portion to the body substantially through the hinge pivot axis; and means for pressure sealing around the clearance opening and around the remainder of the separation line between the nose portion and the body.

2. A swing-nose jointure for a cargo aircraft comprising: a generally cylindrical fuselage; a nose portion and a body portion separable at a vertical plane which is at an acute angle to the longitudinal axis of the aircraft; internal hinge members connecting the nose portion and the body portion and having pivot points on a vertical axis located substantially within the separation plane at the aftmost side of the plane; fuselage wall members in the nose portion and body portion defining a clearance opening in the fuselage wall adjacent the hinge pivot axis, said opening having concave sides converging at the separation line defined by the intersection of the separation plane and the fuselage wall; a closure member pivotally mounted on the hinge pivot points and adapted to fit said opening in a manner which maintains the continuity of the fuselage wall across the opening when the nose portion is closed and adapted to move out of the opening when the nose portion is opened for loading; and means for pressure sealing the nose portion and body portion around the clearance opening and around the remainder of the separation line.

3. A swing-nose jointure according to claim 2, wherein the hinge members comprise a plurality of pairs of opposing, triangular-shaped brackets rigidly attached at one end to the fuselage wall members in the nose and body portions and pivotally interconnected at the other end by a clevis joint.

4. A swing-nose jointure according to claim 2, wherein the pressure sealing means comprise: resilient sealing elements mounted on the periphery of the fuselage wall members adjacent the clearance opening; outwardly directed hooked ends on the closure member adapted to impinge upon said elements in sealing relationship when the nose portion is closed; and a resilient, hollow sealing element having an intermittently perforated innermost face and extending around the jointure and beyond the ends of the first said sealing elements at the junction of closure member tips and the ends of the fuselage wall members.

5. A swing-nose jointure according to claim 2, including guide means for routing flight control cables and electrical wires from the nose portion to the body; said guide means for the cables comprising a rod attached to the closure member in parallel relation to the hinge pivot axis, a series of pulleys mounted on said rod, the circumferences of said pulleys being substantially tangential to the hinge pivot axis so that the cables pass through the hinge pivot axis; and said guide means for the electrical wires comprising a support plate attached to said rod and adjacent to said pulleys.

6. An end-loading jointure for a cargo aircraft comprising: a generally cylindrical fuselage; an end portion and a body portion separable at a vertical plane which is at an acute angle to the longitudinal axis of the aircraft; internal hinge members connecting the end portion and the body portion, said hinge members having a vertical pivot axis located substantially within the separation plane at the side closest to the center of the aircraft; fuselage wall members in the end portion and body portion defining a clearance opening in the fuselage wall adjacent the hinge pivot axis, said opening having concave sides converging at the separation line defined by the intersection of the separation plane and the fuselage wall; a closure member adapted to fit said opening in a manner which maintains the continuity of the fuselage wall across the opening when the end portion is closed and adapted to move out of the opening when the end portion is opened for loading; and means for pressure sealing the nose portion and the body portion around the separation line and around the clearance opening.

No references cited.